United States Patent
Jin et al.

(10) Patent No.: US 12,126,470 B2
(45) Date of Patent: Oct. 22, 2024

(54) DECISION FEEDBACK EQUALIZER AND METHOD FOR ACQUIRING AND CORRECTING DATA

(71) Applicants: Analogix (Suzhou) Semiconductor Co., LTD., Jiangsu (CN); ANALOGIX INTERNATIONAL LLC, Wilmington, DE (US)

(72) Inventors: Jiawei Jin, Beijing (CN); Fei Song, Beijing (CN)

(73) Assignees: Analogix (Suzhou) Semiconductor Co., LTD., Jiangsu (CN); ANALOGIX INTERNATIONAL LLC

( * ) Notice: Subject to any disclaimer, the term of this patent is extended or adjusted under 35 U.S.C. 154(b) by 0 days.

(21) Appl. No.: 17/312,006

(22) PCT Filed: Feb. 4, 2021

(86) PCT No.: PCT/CN2021/075309
§ 371 (c)(1),
(2) Date: Sep. 26, 2023

(87) PCT Pub. No.: WO2022/095297
PCT Pub. Date: May 12, 2022

(65) Prior Publication Data
US 2024/0015053 A1    Jan. 11, 2024

(30) Foreign Application Priority Data
Nov. 5, 2020  (CN) .......................... 202011224933.0

(51) Int. Cl.
H04L 25/03  (2006.01)
(52) U.S. Cl.
CPC .............................. *H04L 25/03057* (2013.01)

(58) Field of Classification Search
CPC ......... H04L 25/03006; H04L 25/03019; H04L 25/03057; H04L 25/03254;
(Continued)

(56) References Cited

U.S. PATENT DOCUMENTS

2010/0329326 A1    12/2010  Aziz et al.
2012/0033726 A1    2/2012   Shibasaki
(Continued)

FOREIGN PATENT DOCUMENTS

CN    103281270 A    9/2013
CN    203278880 U    11/2013
(Continued)

OTHER PUBLICATIONS

First Office Action of Priority Chinese Application No. 202011224933.0 mailed dated on Jul. 19, 2021.
(Continued)

*Primary Examiner* — Young T. Tse
(74) *Attorney, Agent, or Firm* — Samson G. Yu (57) ABSTRACT

The present disclosure discloses a decision feedback equalizer and a method for acquiring and correcting data. The decision equalizer comprises: a first decision sampling circuit; and a second decision sampling circuit; wherein an input end of the first decision sampling circuit is configured to receive sampling data and a first sampling result outputted by the second decision sampling circuit in a previous sampling period; and an input end of the second decision sampling circuit is configured to receive sampling data and a second sampling result outputted by the first decision sampling circuit in a previous sampling period.

8 Claims, 5 Drawing Sheets

(58) Field of Classification Search
CPC ..... H04L 25/03267; H04L 2025/03433; H04L 2025/03439; H04L 2025/03535; H04L 2025/03541; H04L 2025/03547
USPC ........ 375/232, 233, 346, 348; 330/252, 253; 708/322, 323
See application file for complete search history.

(56) References Cited

U.S. PATENT DOCUMENTS

| | | | |
|---|---|---|---|
| 2014/0226707 A1* | 8/2014 | Kaviani | H04L 25/03063 375/233 |
| 2015/0288395 A1 | 10/2015 | Fu et al. | |
| 2016/0191276 A1 | 6/2016 | Sakai et al. | |
| 2016/0241421 A1 | 8/2016 | Lim | |
| 2018/0302264 A1* | 10/2018 | Liao | H04L 7/0062 |
| 2019/0013817 A1* | 1/2019 | Koli | H03M 1/466 |
| 2019/0154032 A1 | 5/2019 | Pal | |

FOREIGN PATENT DOCUMENTS

| | | |
|---|---|---|
| CN | 105187342 A | 12/2015 |
| CN | 105471787 A | 4/2016 |
| CN | 106982182 A | 7/2017 |
| CN | 107395127 A | 11/2017 |
| CN | 110162854 A | 8/2019 |
| JP | 2015149668 A | 8/2015 |
| JP | 2018152731 A | 9/2018 |
| JP | 2019154032 A | 9/2019 |
| KR | 101802791 B1 | 11/2017 |
| TW | 201517569 A | 5/2015 |

OTHER PUBLICATIONS

First Search result of Priority Chinese Application No. 202011224933.0 mailed dated on Jul. 13, 2021.
Supplementary Search result of Priority Chinese Application No. 202011224933.0 mailed dated on Jan. 6, 2022.
PCT Publication document of PCT/CN2021/075309 published on May 12, 2022.

* cited by examiner

DECISION FEEDBACK EQUALIZER AND METHOD FOR ACQUIRING AND CORRECTING DATA

The present disclosure claims the priority of Chinese Patent Application No. 202011224933.0, filed to the Chinese Patent Office on Nov. 5, 2020 and entitled "Decision Feedback Equalizer and Method for Acquiring and Correcting Data", the disclosure of which is incorporated herein by reference in its entirety.

TECHNICAL FIELD

The present disclosure relates to the technical field of data transmission, and in particular, to a decision feedback equalizer and a method for acquiring and correcting data.

BACKGROUND

In a high-speed data transmission process, Inter-Symbol Interference (ISI) is caused due to non-ideal characteristics of a channel, thereby affecting signal integrity.

In the related art, a full-rate decision feedback equalizer is used to eliminate the Inter-Symbol Interference. The full-rate decision feedback equalizer assists in eliminating the ISI existing in the current decision data by using data which has been decided, so as to recover a correct code pattern. With the continuous improvement of the transmission rate of a high-speed interface, the time sequence design requirements of the full-rate equalizer on a circuit are very strict, thereby causing increased design cost and increased difficulty.

In order to solve the problems of increased design cost and increased difficulty caused by strict time sequence requirements of a full-rate equalizer, a half-rate equalizer is proposed in the related art. A half-rate equalizer means that the sampling frequency is half of the data stream frequency, making the time sequence design of a circuit more loose. However, a half-rate decision feedback equalizer first acquires values obtained by adding and subtracting the effect of a previous signal on a subsequent signal in both an odd channel and an even channel, and then judges which acquired value is to be reserved, and thus four sampler amplifiers are required to perform sampling, causing large power consumption and area of the half-rate decision feedback equalizer.

Regarding the problems of high power consumption and large size of a circuit caused by a half-rate decision feedback equalizer using multiple acquisition components in the related art, no effective solution has been proposed yet.

SUMMARY

At least some embodiments of the present disclosure provide a decision feedback equalizer and a method for acquiring and correcting data, so as to solve the problems of high power consumption and large size of a circuit caused by a half-rate decision feedback equalizer using multiple acquisition components in the related art.

According to some embodiments of the present disclosure, a decision feedback equalizer is provided. The decision equalizer comprises: a first decision sampling circuit; and a second decision sampling circuit, wherein the first decision sampling circuit and the second decision sampling circuit are configured to perform sampling by means of opposite sampling clock signals; wherein an input end of the first decision sampling circuit is configured to receive sampling data, the input end of the first decision sampling circuit is further connected with an output end of the second decision sampling circuit, and the first decision sampling circuit is configured to receive a first sampling result outputted by the second decision sampling circuit in a previous sampling period, so as to determine a first correction mode for the sampling data by means of the first sampling result, and correct the sampling data by means of the first correction mode; and an input end of the second decision sampling circuit is configured to receive the sampling data, the input end of the second decision sampling circuit is further connected with an output end of the first decision sampling circuit, and the second decision sampling circuit is configured to receive a second sampling result outputted by the first decision sampling circuit in a previous sampling period, so as to determine a second correction mode for the sampling data by means of the second sampling result, and correct the sampling data by means of the second correction mode.

Optionally, the first correction mode is one of the following: superimposing the sampling data and first sampling correction data, or subtracting between the sampling data and the first sampling correction data; and the second correction mode is one of the following: superimposing the sampling data and second sampling correction data, or subtracting between the sampling data and the second sampling correction data.

Optionally, the first decision sampling circuit or the second decision sampling circuit comprises: a selective sampling circuit, an input end of the selective sampling circuit is configured to receive the sampling data and a sampling result acquired in a previous sampling period, determine a correction mode for the sampling data by means of the sampling result, correct and amplify the sampling data to output a first sampling data; an amplifying and comparing circuit, an input end of the amplifying and comparing circuit is connected with an output end of the selective sampling circuit, and the amplifying and comparing circuit is configured to amplify the first sampling data, and perform a positive and negative decision according to the amplified result to output the decision result; and a holding circuit, an input end of the holding circuit is connected with an output end of the amplification and comparison circuit, and the holding circuit is configured to hold the decision result, and determine the held decision result as a sampling result of the current sampling period.

Optionally, the selective sampling circuit comprises: a first differential amplification circuit; and a second differential amplification circuit, wherein the first differential amplification circuit and the second differential amplification circuit are respectively configured to receive the same sampling clock signal; wherein a first input end of the first differential amplification circuit is configured to receive a sampling result acquired in a previous sampling period, and then determine whether to turn on or turn off the first differential amplification circuit through the sampling result, two differential input ends of the first differential amplification circuit are configured to respectively receive a superimposition result of the sampling data and sampling correction data, and amplify the superimposed results to output two first differential output signals; and a first input end of the second differential amplification circuit is configured to receive a sampling result acquired in a previous sampling period, and then determine whether to turn on or turn off the second differential amplification circuit through the sampling result, two differential input ends of the second differential amplification circuit are configured to respectively receive a subtraction result of the sampling data and the sampling correction data, and amplify the subtracted results to output two second differential output signals.

Optionally, the amplifying and comparing circuit comprises: a third differential amplification circuit, connected with the sampling clock signal and configured to amplify the two first differential output signals or the two second differential output signals, so as to obtain two third differential output signals; and a comparing circuit, connected with the sampling clock signal and configured to receive the two third differential output signals, and compare the two third differential output signals, so as to obtain a first decision signal and a second decision signal.

Optionally, the third differential amplification circuit comprises two sets of differential input ends, wherein a first set of differential input ends are respectively connected with two differential output ends of the first differential amplification circuit and configured to amplify the two first differential output signals when the second differential amplification circuit is turned off and the second set of differential input ends are closed, so as to output the two third differential output signals; and a second set of differential input ends are respectively connected with two differential output ends of the second differential amplification circuit, and configured to amplify the two second differential output signals when the first differential amplification circuit is turned off and the first set of differential input ends are closed, so as to obtain two third differential output signals.

Optionally, the selective sampling circuit further comprises: a first functional circuit; and a second functional circuit, wherein input ends of the first functional circuit and the second functional circuit are respectively configured to receive a sampling result in a previous period; wherein an output end of the first functional circuit is connected with the first set of differential input ends of the third differential amplification circuit, and the first functional circuit is configured to judge whether the first set of differential input ends are closed according to the sampling result; and an output end of the second functional circuit is connected with the second set of differential input ends of the third differential amplification circuit, and the second functional circuit is configured to judge whether the second set of differential input ends are closed according to the sampling result.

Optionally, the comparing circuit comprises: a first inverter; and a second inverter, wherein the first inverter and the second inverter are respectively configured to receive the sampling clock signals; and an input end of the first inverter is connected with an output end of the second inverter, an input end of the second inverter is connected with an output end of the first inverter, the input end of the first inverter and the input end of the second inverter are configured to respectively receive the two third differential output signals, and the output end of the first inverter and the output end of the second inverter are configured to respectively output the first decision signal and the second decision signal.

Optionally, the holding circuit is a latch.

Some other embodiments of the present disclosure further provide a method for acquiring and correcting data, applied to the decision feedback equalizer according to any one of the foregoing items. Said method comprises: a sampling result obtained by acquiring sampling data in a previous sampling period is acquired, and a correction mode for the sampling data according to the sampling result is determined, wherein the correction mode is used for superimposing the sampling data and sampling correction data, or subtracting the sampling data and the sampling correction data; the sampling data by using the correction mode is corrected to obtain corrected data; and the corrected data is collected to output an collection result.

In some embodiments of the present disclosure, by means of the first decision sampling circuit; and the second decision sampling circuit, wherein the first decision sampling circuit and the second decision sampling circuit are configured to perform sampling by using opposite sampling clock signals; wherein an input end of the first decision sampling circuit is configured to receive sampling data, the input end of the first decision sampling circuit is further connected with an output end of the second decision sampling circuit, and the first decision sampling circuit is configured to receive a first sampling result outputted by the second decision sampling circuit in a previous sampling period, so as to determine a first correction mode for the sampling data by means of the first sampling result, and correct the sampling data by means of the first correction mode; and an input end of the second decision sampling circuit is configured to receive the sampling data, the input end of the second decision sampling circuit is further connected with an output end of the first decision sampling circuit, and the second decision sampling circuit is configured to receive a second sampling result outputted by the first decision sampling circuit in a previous sampling period, so as to determine a second correction mode for the sampling data by means of the second sampling result, and correct the sampling data by means of the second correction mode, the problems of high power consumption and large size of a circuit caused by a half-rate decision feedback equalizer using multiple acquisition components in the related art are solved. The first decision sampling circuit and the second decision sampling circuit are configured to first determine a correction mode for sampling data, and then correct and acquire the sampling data, thereby reducing the use of acquisition components, and then achieving the effects of reducing the power consumption of a circuit and decreasing the size of the circuit.

BRIEF DESCRIPTION OF THE DRAWINGS

The drawings, constituting a part of some embodiments of the present disclosure, are used for providing further understanding of some embodiments of the present disclosure, and the illustrative embodiments of the present disclosure and illustrations thereof are used for explaining the present disclosure, rather than constitute inappropriate limitation on some embodiments of the present disclosure. In the drawings.

DETAILED DESCRIPTION OF THE EMBODIMENTS

It is to be noted that embodiments and the features in the embodiments of the present disclosure can be combined without conflicts. Hereinafter, the present disclosure will be described in detail with reference to the accompanying drawings in combination with the embodiments.

In order to make those skilled in the art to understand the solutions of the present disclosure better, hereinafter, the technical solutions in the embodiments of the present disclosure will be described clearly and thoroughly with reference to the accompanying drawings of some embodiments of the present disclosure. Obviously, the embodiments as described are only some of the embodiments of the present disclosure, and are not all the embodiments. All other embodiments obtained by a person of ordinary skill in the art based on the embodiments of the present disclosure without any inventive effort shall all fall within the scope of protection of some embodiments of the present disclosure.

It should be noted that the terms "first", "second" etc., in the description, claims, and accompanying drawings of the present disclosure are used to distinguish similar objects, and are not necessarily used to describe a specific sequence or order. It should be understood that the data so used may be interchanged where appropriate so that the embodiments of the present disclosure described herein can be implemented in sequences other than those illustrated or described herein. In addition, the terms "comprise" and "have", and any variations thereof are intended to cover a non-exclusive inclusion, for example, a process, method, system, product, or device that comprises a series of steps or units is not necessarily limited to those steps or units that are clearly listed, but may comprise other steps or units that are not clearly listed or inherent to such process, method, product, or device.

For ease of description, some nouns or terms involved in the embodiments of the present disclosure are described below:

Inter-Symbol Interference: ISI for short, full name in English is Inter-Symbol Interference, refers to coherent jamming between signals at high-speed transmission.

Sampler Amplifier: SA for short, full name in English is Sampler Amplifier.

Multiplexer: MUX for short, full name in English is multiplexer.

In order to solve the problems of increased design cost and increased difficulty caused by strict time sequence requirements of a full-rate equalizer in the related art, the following half-rate decision feedback equalizer is proposed in the related art.

Figure 1:
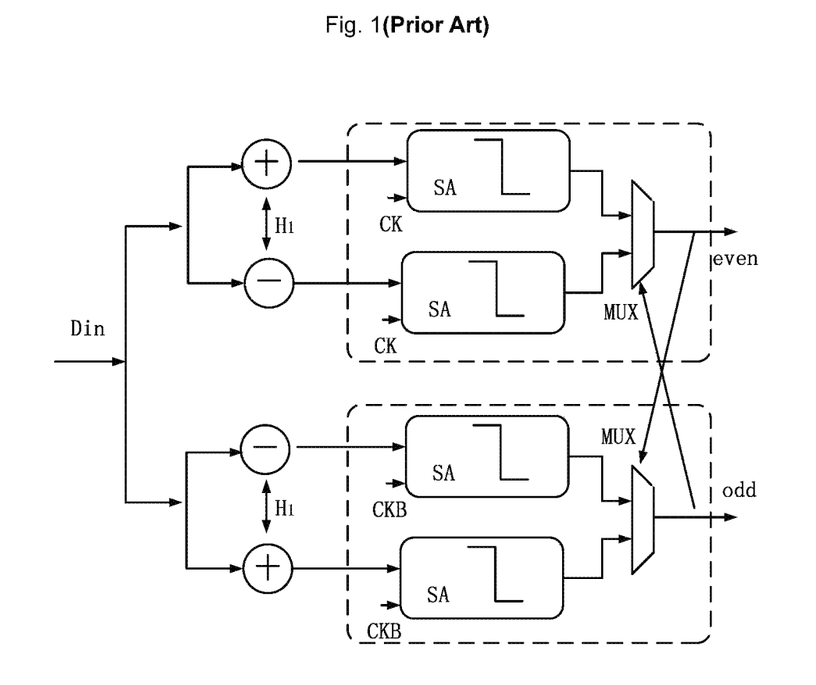
FIG. 1 is a schematic diagram of a decision feedback equalizer provided according to the related art.

As shown in FIG. 1, when data is inputted, sampler amplifiers (SAs) in an odd channel and an even channel perform sampling on the data, wherein CKB is an inverted phase of CK, data odd is obtained in the odd data channel, and data even is obtained in the even data channel.

Figure 2:
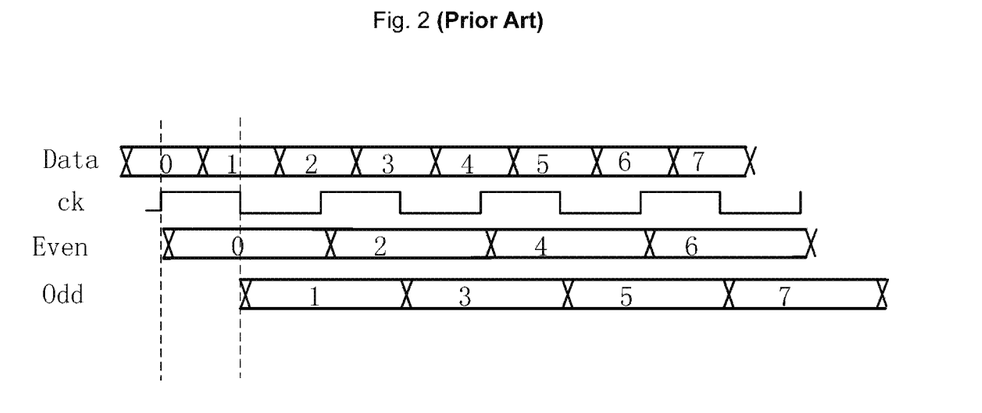
FIG. 2 is a sampling time sequence diagram of a decision feedback equalizer provided according to the related art.

FIG. 2 is a sampling time sequence diagram of FIG. 1. As shown in FIG. 2, in order to eliminate the effect of data1 on data2, before the even data channel samples data2, it is decided whether H1 is added to data2 or H1 is subtracted from data2 by using the sampling result of data1 in the odd data channel (H1 represents a voltage amplitude for eliminating the effect of ISI).

If the sampling result of data1 is 1, it indicates that the effect thereof on data2 is positive, which will achieve the effect of increasing the voltage of data of data2; and in the even data channel, a multiplexer (MUX) will select an SA with a negative H1. By the same reasoning, if the sampling result of data1 is 0, it indicates that the effect of data1 on data2 is negative, and in the even data channel, the MUX will select an SA with a positive H1. Accordingly, the half-rate decision feedback equalizer in the related art uses four SAs, causing large power consumption and area.

On this basis, the present disclosure seeks to provide a solution capable of solving the described technical problem, and the detailed content thereof will be set forth in the subsequent embodiments.

Embodiment I

According to Embodiment I of the present disclosure, a decision feedback equalizer is provided.

Figure 3:
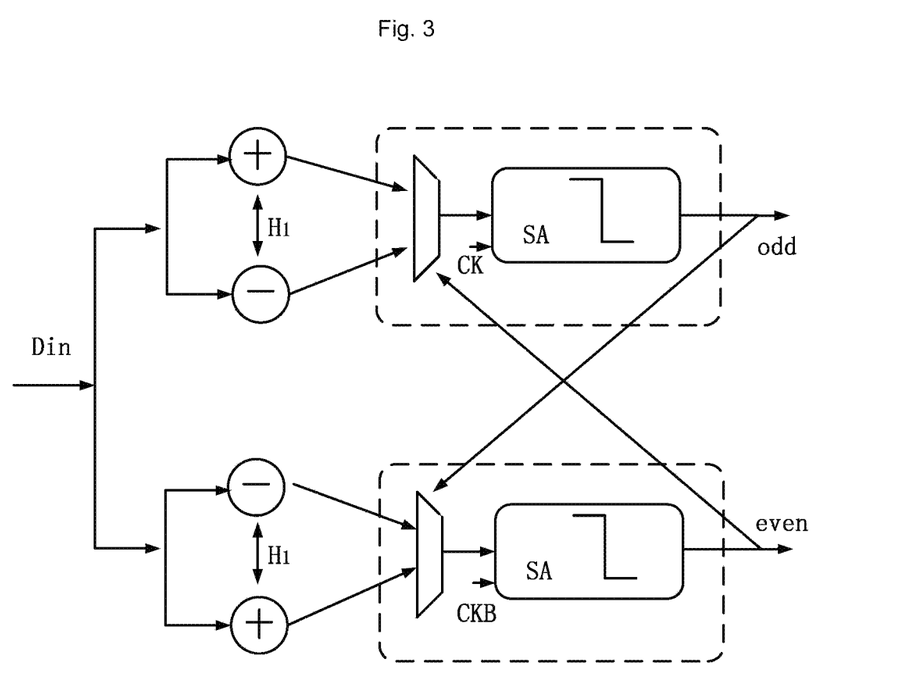
FIG. 3 is a schematic diagram of a decision feedback equalizer provided according to Embodiment I of the present disclosure.

FIG. 3 is a schematic diagram of a decision feedback equalizer according to Embodiment I of the present disclosure. As shown in FIG. 3, the decision equalizer comprises:

a first decision sampling circuit; and a second decision sampling circuit, wherein the first decision sampling circuit and the second decision sampling circuit are configured to perform sampling by means of opposite sampling clock signals.

Wherein an input end of the first decision sampling circuit is configured to receive sampling data, the input end of the first decision sampling circuit is further connected with an output end of the second decision sampling circuit, and the first decision sampling circuit is configured to receive a first sampling result outputted by the second decision sampling circuit in a previous sampling period, so as to determine a first correction mode for the sampling data by means of the first sampling result, and correct the sampling data by means of the first correction mode; and an input end of the second decision sampling circuit is configured to receive sampling data, the input end of the second decision sampling circuit is further connected with an output end of the first decision sampling circuit, and the second decision sampling circuit is configured to receive a second sampling result outputted by the first decision sampling circuit in a previous sampling period, so as to determine a second correction mode for the sampling data by means of the second sampling result, and correct the sampling data by means of the second correction mode.

As shown in FIG. 3, when the decision feedback equalizer in the embodiments of the present disclosure is used to acquire sampling data, data of an even sequence can be acquired by using a rising edge signal CK of a sampling clock by means of the first decision sampling circuit of an even channel; and on the contrary, data of an odd sequence can be acquired by using a falling edge signal CKB of the sampling clock by means of the second decision sampling circuit of an odd channel, thereby completing acquisition of the sampling data.

It should be noted that the first decision sampling circuit and the second decision sampling circuit are respectively circuits in the dashed-line boxes in the odd channel and the even channel; and the circuit within each dashed-line box integrates functions of one MUX and one SA, and is configured to receive the sampling result acquired by another channel in a previous sampling period while receiving sampling data (for the even channel, receiving the sampling result odd of the odd channel, and for the odd channel, receiving the sampling result even of the even channel). The MUX first determines a correction mode on the basis of the sampling result, then the SA acquires the corrected sampling data, which, compared with the half-rate decision feedback equalizer in the related art, reduces the number of sampler amplifiers used, thereby reducing nearly half of the power consumption and area.

In addition, it should be noted that when the MUX is added inside the SA, compared with the timing constraint of $T_{SA}+T_{mux}<1UI$ in the half-rate decision feedback equalizer in the related art ($T_{SA}$ refers to the time between the SA sampling data and the data being transmitted to the MUX, $T_{mux}$ refers to the time during which the data is transmitted from an input end to an output end of the MUX, and 1UI refers to a sum of durations of high level and low level of a sampling clock), the timing constraint thereof is equivalent to extending time for one $T_{mux}$, thereby being able to sample higher data stream, and improving the sampling rate of the decision feedback equalizer.

The first correction mode and the second correction mode are both used to eliminate inter-symbol interference of sampling data. Optionally, in the decision feedback equalizer provided in some embodiments of the present disclosure, the first correction mode is one of the following: superimposing the sampling data and first sampling correction data, or subtracting the sampling data and the first sampling correction data; and the second correction mode is one of the following: superimposing the sampling data and second sampling correction data, or subtracting the sampling data and the second sampling correction data.

In the decision feedback equalizer provided in some embodiments of the present disclosure, by means of a first decision sampling circuit; and a second decision sampling circuit, wherein the first decision sampling circuit and the second decision sampling circuit are configured to perform sampling by means of opposite sampling clock signals; wherein an input end of the first decision sampling circuit is configured to receive sampling data, the input end of the first decision sampling circuit is further connected with an output end of the second decision sampling circuit, and the first decision sampling circuit is configured to receive a first sampling result outputted by the second decision sampling circuit in a previous sampling period, so as to determine a first correction mode for the sampling data by means of the first sampling result, and correct the sampling data by means of the first correction mode; and an input end of the second decision sampling circuit is configured to receive the sampling data, the input end of the second decision sampling circuit is further connected with an output end of the first decision sampling circuit, and the second decision sampling circuit is configured to receive a second sampling result outputted by the first decision sampling circuit in a previous sampling period, so as to determine a second correction mode for the sampling data by means of the second sampling result, and correct the sampling data by means of the second correction mode, the problems of high power consumption and large size of a circuit caused by a half-rate decision feedback equalizer using multiple acquisition components in the related art are solved. The first decision sampling circuit and the second decision sampling circuit are configured to first determine a correction mode for sampling data, and then correct and acquire the sampling data, thereby reducing the use of acquisition devices, and then achieving the effects of reducing the power consumption of a circuit and decreasing the size of the circuit.

As shown in FIG. 3, the first correction mode is adding H1 based on the sampling data of the even channel, or subtracting H1 based on the sampling data of the even channel. By the same reasoning, the second correction mode is adding H1 based on the sampling data of the odd channel, or subtracting H1 based on the sampling data of the odd channel.

The first decision sampling circuit and the second decision sampling circuit have the same circuit structure. Optionally, in the decision feedback equalizer provided in the embodiments of the present disclosure, the first decision sampling circuit or the second decision sampling circuit comprises: a selective sampling circuit, an input end of the selective sampling circuit is configured to receive the sampling data and a sampling result acquired in a previous sampling period, determine a correction mode for the sampling data through the sampling result, and correct and amplifying the sampling data to output a first sampling data; an amplifying and comparing circuit, an input end of the amplifying and comparing circuit is connected with an output end of the selective sampling circuit, and the amplifying and comparing circuit is configured to amplify the first sampling data, and perform a positive and negative decision according to the amplification result to output the decision result; and a holding circuit, an input end of the holding circuit being connected with an output end of the amplification and comparison circuit, and the holding circuit being configured to hold the decision result, and determine the held decision result as a sampling result of the current sampling period.

Specifically, the selective sampling circuit is used to achieve the function of selecting first and then sampling, the sampled data is a corrected data, the amplifying and comparing circuit is configured to decide the corrected data, and the holding circuit is configured to hold the decision result, for facilitating reading of the decision result.

The selective sampling circuit is functionally a sampling pre-amplification circuit with a mux selection function. Optionally, in the decision feedback equalizer provided in some embodiments of the present disclosure, the selective sampling circuit comprises: a first differential amplification circuit; and a second differential amplification circuit, wherein the first differential amplification circuit and the second differential amplification circuit are respectively configured to receive the same sampling clock signal; wherein a first input end of the first differential amplification circuit is configured to receive a sampling result acquired in a previous sampling period, and then determine whether to turn on or turn off the first differential amplification circuit through the sampling result, two differential input ends of the first differential amplification circuit are configured to respectively receive a superimposition result of the sampling data and sampling correction data, and amplify the superimposed result to output two first differential output signals; and a first input end of the second differential amplification circuit is configured to receive a sampling result acquired in a previous sampling period, and then determine whether to turn on or turn off the second differential amplification circuit through the sampling result, two differential input ends of the second differential amplification circuit are configured to respectively receive a subtraction result of the sampling data and the sampling correction data, and amplify the subtracted result to output two second differential output signals.

Figure 4:
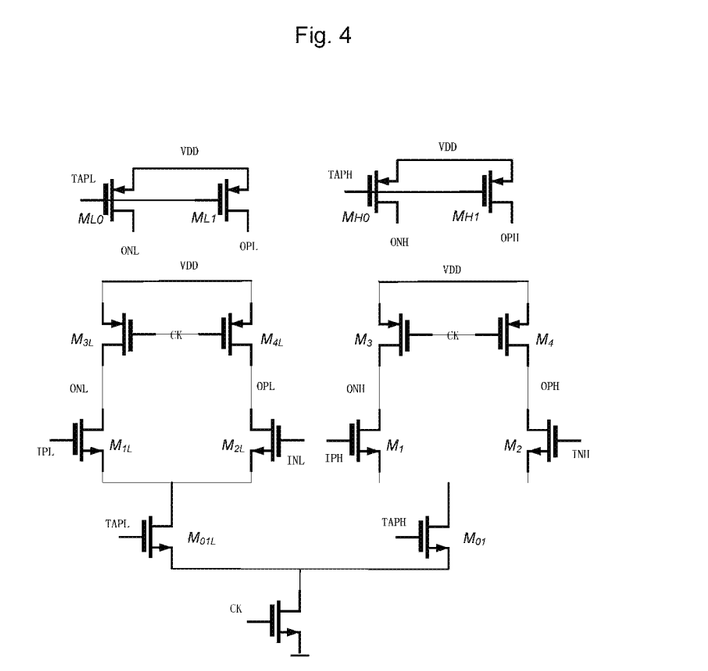
FIG. 4 is a schematic diagram of a selective sampling circuit in the decision feedback equalizer provided according to Embodiment I of the present disclosure.

As shown in FIG. 4, in the present embodiment, taking the first decision sampling circuit of the even channel as an example, the structure of the selective sampling circuit is introduced, wherein the first differential amplification circuit is composed of switch tubes M3L, M4L, M1L, M2L and M01L, the second differential amplification circuit is composed of switch tubes M3, M4, M1, M2 and M01, and the first differential amplification circuit and the second differential amplification circuit are respectively configured to receive the same sampling clock signal CK.

Specifically, a first input end of the first differential amplification circuit, i.e., the G pin of M01L, is configured to receive sampling result acquired in the previous sampling period of the odd channel. As the M01L is an NMOS transistor, when the sampling result is 0, i.e., a low level signal TAPL, the first differential amplification circuit is turned on, and two differential input ends of the first differential amplification circuit, i.e., G pins of M1L and M2L, are configured to respectively receive results IPL and INL obtained by subtracting the sampling data and sampling correction data, and amplify the subtracted results to output two first differential output signals ONL and OPL.

A first input end of the second differential amplification circuit, i.e., the G pin of M01, is configured to receive a sampling result acquired in a previous sampling period of the odd channel. As the M01L is an NMOS transistor, when the sampling result is 1, i.e., a high level signal TAPH, the second differential amplification circuit is turned on, and two differential input ends of the second differential amplification circuit, i.e., G pins of M1 and M2, are configured to respectively receive results IPH and INH obtained by superimposing the sampling data and the sampling correction data, and amplify the superimposed results to output two second differential output signals ONH and OPH.

The amplifying and comparing circuit is configured to amplify the two first differential output signals or the two second differential output signals outputted by the selective sampling circuit and perform decision thereon, thereby enabling the sampling result readable. Optionally, in the decision feedback equalizer provided in some embodiments of the present disclosure, the amplification and comparison circuit comprises: a third differential amplification circuit, connected with the sampling clock signal and configured to amplify the two first differential output signals or the two second differential output signals, so as to obtain two third differential output signals; and a comparing circuit, connected with the sampling clock signal and configured to receive the two third differential output signals, and compare the two third differential output signals, so as to obtain a first decision signal and a second decision signal.

Figure 5:
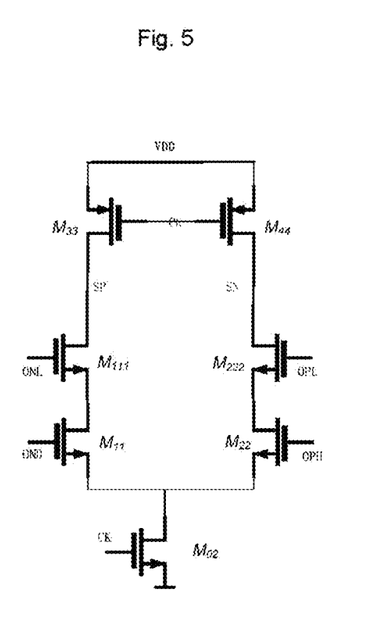
FIG. 5 is a schematic diagram of a third differential amplification circuit in the selective sampling circuit provided according to Embodiment I of the present disclosure.

As shown in FIG. 5, the third differential amplification circuit is composed of switch tubes M33, M44, M111, M222, M11, M22 and M02, and same as the selective sampling circuit, is connected with the sampling clock signal CK. The third differential amplification circuit amplifies the two first differential output signals ONL and OPL when the first differential amplification circuit is turned on and the second differential amplification circuit is turned off, so as to obtain two third differential output signals SP and SN; and the third differential amplification circuit amplifies the two second differential output signals ONH and OPH when the second differential amplification circuit is turned on and the first differential amplification circuit is turned off, so as to obtain two third differential output signals SP and SN.

Optionally, in the decision feedback equalizer provided in some embodiments of the present disclosure, the third differential amplification circuit comprises two sets of differential input ends, wherein the first set of differential input ends are respectively connected with two differential output ends of the first differential amplification circuit and configured to amplify the two first differential output signals when the second differential amplification circuit is turned off and the second set of differential input ends are closed, so as to output the two third differential output signals; and a second set of differential input ends are respectively connected with two differential output ends of the second differential amplification circuit, and configured to amplify the two second differential output signals when the first differential amplification circuit is turned off and the first set of differential input ends are closed, so as to obtain two third differential output signals.

As shown in FIG. 5, the first set of differential input ends M111 and M222 are connected with output ends M1L and M2L of the first differential amplification circuit; and the second set of differential input ends M11 and M22 are connected with output ends M1 and M2 of the second differential amplification circuit. When amplifying the two first differential output signals ONL and OPL, in order to avoid the effect of the second differential amplification circuit, the second set of differential input ends M11 and M22 are controlled to be closed, in which the conduction of M11 and M22 is equivalent to a wire, which avoids the effect of the second differential amplification circuit when amplifying the two first differential output signals. When amplifying the two second differential output signals ONH and OPH, in order to avoid the effect of the first differential amplification circuit, the first set of differential input ends M111 and M222 are controlled to be closed, in which conduction of M111 and M222 is equivalent to a wire, thereby avoiding the effect of the first differential amplification circuit when amplifying the two second differential output signals.

A functional circuit of the selective sampling circuit is used to control closing and opening of the first set of differential input ends and the second set of differential input ends. Optionally, in the decision feedback equalizer provided in some embodiments of the present disclosure, the selective sampling circuit further comprises: a first functional circuit; and a second functional circuit, wherein input ends of the first functional circuit and the second functional circuit are respectively configured to receive a sampling result in a previous period; wherein an output end of the first functional circuit is connected with the first set of differential input ends of the third differential amplification circuit, and the first functional circuit is configured to judge whether the first set of differential input ends are closed according to the sampling result; and an output end of the second functional circuit is connected with the second set of differential input ends of the third differential amplification circuit, and the second functional circuit is configured to judge whether the second set of differential input ends are closed according to the sampling result.

As shown in FIG. 4, the first functional circuit is composed of switch tubes ML0 and ML1, and the second functional circuit is composed of switch tubes MH0 and MH1, wherein ML0, ML1, MH0 and MH1 are PMOS transistors. When the output result of a second decision sampler amplifier of the odd channel is 0, i.e., a low level TAPL, ONL and OPL are 1, the first set of differential input ends M111 and M222 are closed; and when the third differential amplification circuit amplifies the two second differential output signals ONH and OPH, M111 and M222 are equivalent to a wire, thereby avoiding the effect of the first differential amplification circuit.

On the contrary, when the output result of the second decision sampler amplifier is 1, i.e., a high level TAPL, ONH and OPH are 1, the second set of differential input ends M11 and M22 are closed; and when the third differential amplification circuit amplifies the two first differential output signals ONL and OPL, M11 and M22 are equivalent to a wire, thereby avoiding the effect of the second differential amplification circuit.

In addition to the third differential amplification circuit, the amplifying and comparing circuit further comprises a comparing circuit. Optionally, in the decision feedback equalizer provided in some embodiments of the present disclosure, the comparing circuit comprises: a first inverter; and a second inverter, wherein the first inverter and the second inverter are respectively configured to receive the sampling clock signals; an input end of the first inverter is connected with an output end of the second inverter, an input end of the second inverter is connected with an output end of the first inverter, the input end of the first inverter and the input end of the second inverter are configured to respectively receive the two third differential output signals, and the output end of the first inverter and the output end of the second inverter are configured to respectively output the first decision signal and the second decision signal.

Figure 6:
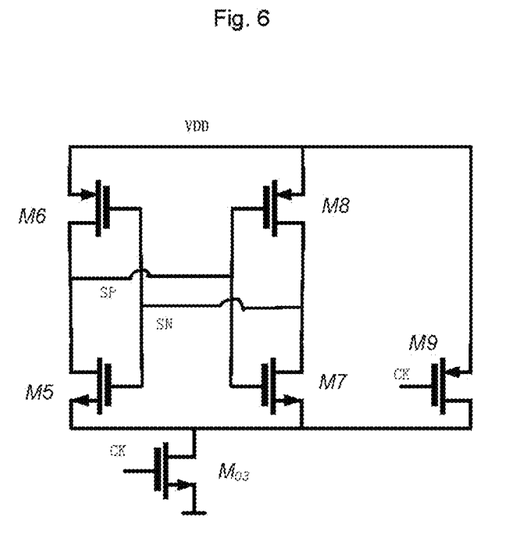
FIG. 6 is a schematic diagram of a comparing circuit in the decision feedback equalizer provided according to Embodiment I of the present disclosure.

As shown in FIG. 6, the comparing circuit is also configured to receive a sampling clock signal CK, and the comparing circuit comprises M6, M8, M5, M7, M9 and M03, wherein the M6 and M5 constitute the first inverter, the M8 and M7 constitute the second inverter, an input end of the first inverter is connected with an output end of the second inverter, an input end of the second inverter is connected with an output end of the first inverter, an input end of the first inverter is connected with a third differential output signal SN, and an input end of the second inverter is connected with a third differential output signal SP.

It should be noted that ONL and OPL, ONH and OPH are rising edge signals with different slopes or falling edge signals with different slopes, SP and SN are slope signals amplified by the third differential amplification circuit, i.e. two slope signals with different slopes. In order to decide readable corrected sampling data, the comparing circuit is used to compare the slopes of SP and SN, so as to obtain the first decision signal and the second decision signal.

Specifically, for the rising edge signals, the signal with a larger slope is decided as 1, and the signal with a smaller slope is decided as 0. For the falling edge signals, the signal with a larger slope is decided as 0, and the signal with a smaller slope is decided as 1, so as to achieve decision of the sampling data.

In order to stably output the decision signals, optionally, in the decision feedback equalizer provided in some embodiments of the present disclosure, the holding circuit is a latch.

Figure 7:
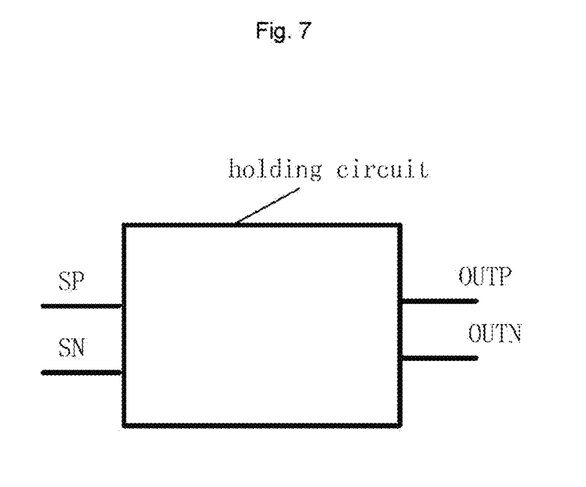
FIG. 7 is a schematic diagram of a holding circuit in the decision feedback equalizer provided according to Embodiment I of the present disclosure.

Specifically, as shown in FIG. 7, the holding circuit may be a latch, and decision results SP and SN are inputted so as to obtain held decision results OUP and OUTN, and the decision results can be held within a period of time, facilitating a subsequent circuit reading the acquired corrected sampling data.

Embodiment II

Embodiment II of the present disclosure further provides a method for acquiring and correcting data. It should be noted that the method for acquiring and correcting data in some embodiments of the present disclosure may be applied to the decision feedback equalizer provided in some embodiments of the present disclosure. Hereinafter, the method for acquiring and correcting data provided according to some embodiments of the present disclosure is introduced.

Figure 8:
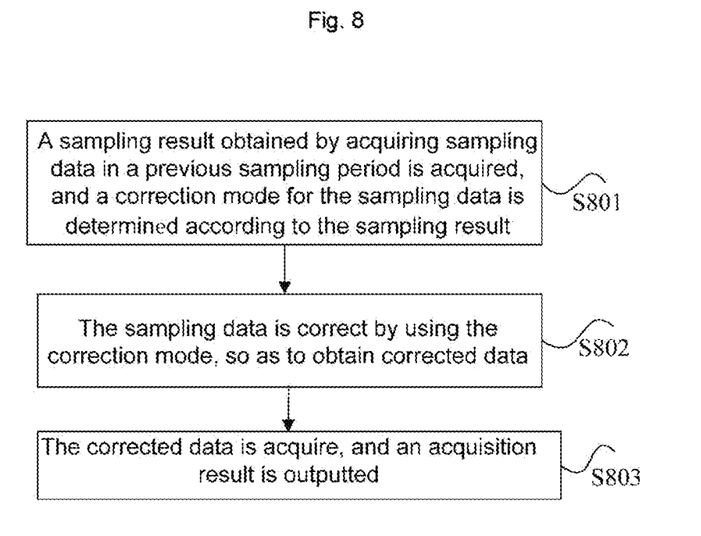
FIG. 8 is a flowchart of a method for acquiring and correcting data provided according to Embodiment II of the present disclosure.

FIG. 8 is a flowchart of a method for acquiring and correcting data according to Embodiment II of the present disclosure. As shown in FIG. 8, the method comprises the following steps:

step S802: a sampling result obtained by acquiring sampling data in a previous sampling period is acquired, and a correction mode for the sampling data is determined according to the sampling result, wherein the correction mode is to superimpose the sampling data and sampling correction data, or subtract the sampling data and the sampling correction data;

step S804: the sampling data is corrected by using the correction mode, so as to obtain corrected data; and step S806: the corrected data is acquired, and an acquisition result is outputted.

Specifically, the sampling result in a previous sampling period is the sampling result of previous sampling data, and the correction mode is determined according to the current sampling data and the previous sampling data. For example, if the transmitted data is 001, the previous sampling data is 0, and the current sampling data is 1, the effect of the previous sampling data 0 on the current sampling data 1 is negative, the sampling data 1 and sampling correction data are superimposed, thereby correcting the sampling data.

For another example, if the transmitted data is 011, the previous sampling data is 1, and the current sampling data is 1, the effect of the previous sampling data 1 on the current sampling data 1 is positive, the sampling data 1 and the sampling correction data are subtracted, thereby correcting the sampling data.

It should be noted that the correction mode is determined first, and then sampling data is corrected and acquired. On the one hand, compared with the half-rate decision feedback equalizer in the related art, the number of sampler amplifiers used is reduced, thereby reducing nearly half of the power consumption and area. On the other hand, compared with the timing constraint of $T_{SA}$+Tmux<1UI in the half-rate decision feedback equalizer in the related art, the timing constraint thereof is equivalent to extending time for one Tmux, thereby being able to sample higher data stream, and improving the sampling rate of the decision feedback equalizer.

The method for acquiring and correcting data provided in some embodiments of the present disclosure, a sampling result obtained by acquiring sampling data in a previous sampling period is acquired, and a correction mode for the sampling data is determined according to the sampling result, wherein the correction mode is to superimpose the sampling data and sampling correction data, or subtract the sampling data and the sampling correction data; the sampling data is corrected by using the correction mode, so as to obtain corrected data; and the corrected data is acquired, and an acquisition result is outputted, and thus the problems of high power consumption and large size of a circuit caused by a half-rate decision feedback equalizer using multiple acquisition components in the related art are solved. By first determining a correction mode for sampling data, and then correcting and acquiring the sampling data, the use of acquisition components is reduced, further achieving the effects of reducing the power consumption of a circuit and decreasing the size of the circuit.

It should be noted that the steps illustrated in the flowchart of the drawings can be executed in a computer system such as a set of computer executable instructions, and although a logical order is shown in the flowchart, in some cases, the steps shown or described can be executed in a different order from that described here.

It should also be noted that the terms "comprise", "include", or any other variation thereof are intended to cover a non-exclusive inclusion, so that a process, a method, a commodity, or a device that comprises a series of elements not only comprises those elements, but also comprises other elements that are not explicitly listed, or further comprises inherent elements of the process, the method, the commodity, or the device. Without further limitation, an element defined by a sentence "comprise a . . . " does not exclude other same elements existing in a process, a method, a commodity, or a device that comprises the element.

As will be appreciated by one skilled in the art, embodiments of the present disclosure may be provided as a method, a system, or a computer program product. Therefore, the present disclosure may take the form of an entirely hardware embodiment, an entirely software embodiment or an embodiment combining software and hardware. Furthermore, the present disclosure may take the form of a computer program product implemented on one or more computer-usable storage media (including but not limited to a disk memory, a CD-ROM, an optical memory, etc.) containing computer-usable program codes.

The described content merely relates to embodiments of the present disclosure, and is not intended to limit some embodiments of the present disclosure. For those skilled in the art, the present disclosure may have various modifications and variations. Any modifications, equivalent replacements, improvements, etc. made within the spirit and principle of the present disclosure shall belong to the scope of the claims of the present disclosure.

INDUSTRIAL APPLICABILITY

The solutions provided in some embodiments of the present disclosure may be applied to the technical field of data transmission technologies. In some embodiments of the present disclosure, the decision equalizer comprises: a first decision sampling circuit; and a second decision sampling circuit; an input end of the first decision sampling circuit is configured to receive sampling data and a first sampling result outputted by the second decision sampling circuit in a previous sampling period, so as to determine a first correction mode for the sampling data by means of the first sampling result, and correct the sampling data by means of the first correction mode; and an input end of the second decision sampling circuit is configured to receive the sampling data and a second sampling result outputted by the first decision sampling circuit in a previous sampling period, so as to determine a second correction mode for the sampling data according to the second sampling result, and correct the sampling data according to the second correction mode. The first decision sampling circuit and the second decision sampling circuit first determine a correction mode for sampling data, and then correct and acquire the sampling data, thereby reducing the use of acquisition components, and solving the problems of high power consumption and large size of a circuit caused by a half-rate decision feedback equalizer using multiple acquisition components in the related art.

What is claimed is:

1. A decision feedback equalizer, comprising:
a first decision sampling circuit configured to perform a first sampling result with a first sampling clock signal; and
a second decision sampling circuit configured to perform a second sampling result with a second sampling clock signal opposite the first sampling clock signal,
wherein an input of the first decision sampling circuit is configured to receive input sampling data, the input of the first decision sampling circuit is further configured to receive the second sampling result from an output of the second decision sampling circuit in a previous sampling period to determine a first correction mode for the input sampling data of the first sampling result and correct the input sampling data of the first correction mode,
wherein an input of the second decision sampling circuit is configured to receive the input sampling data, and the input of the second decision sampling circuit is further configured to receive the first sampling result from an output of the first decision sampling circuit in a previous sampling period to determine a second correction mode for the input sampling data of the second sampling result and correct the input sampling data of the second correction mode, and;
wherein the first decision sampling circuit or the second decision sampling circuit comprises:
a selective sampling circuit, an input of the selective sampling circuit is configured to receive the input sampling data and a sampling result acquired in a previous sampling period, determine a correction mode for the input sampling data through the sampling result acquired in the previous sampling period, and correct and amplify the input sampling data to output sampling data;
an amplifying and comparing circuit, an input of the amplifying and comparing circuit is connected with an output of the selective sampling circuit, and the amplifying and comparing circuit is configured to amplify the sampling data, and perform a positive decision and a negative decision according to an amplified result to output a decision result; and
a holding circuit, an input of the holding circuit is connected with an output of the amplification and comparison circuit, and the holding circuit is configured to hold the decision result, and determine a held decision result as a sampling result of a current sampling period.

2. The decision feedback equalizer as claimed in claim 1, wherein the first correction mode is one of the following: superimposing the input sampling data and first sampling correction data, or subtracting the input sampling data and the first sampling correction data, and wherein the second correction mode is one of the following: superimposing the input sampling data and second sampling correction data, or subtracting the input sampling data and the second sampling correction data.

3. The decision feedback equalizer as claimed in claim 1, wherein the selective sampling circuit comprises:
a first differential amplification circuit configured to receive the first sampling clock signal; and
a second differential amplification circuit configured to receive the first sampling clock signal,
wherein, a first input of the first differential amplification circuit is configured to receive the sampling result acquired in the previous sampling period and then determine whether to turn on or turn off the first differential amplification circuit through the sampling result acquired in the previous sampling period, two differential inputs of the first differential amplification circuit are configured to respectively receive a superimposition result of the input sampling data and sampling correction data, and amplify the superimposed result to output two first differential output signals, and wherein a first input of the second differential amplification circuit is configured to receive the sampling result acquired in the previous sampling period and determine whether to turn on or turn off the second differential amplification circuit through the sampling result acquired in the previous sampling period, two differential inputs of the second differential amplification circuit are configured to respectively receive a subtraction result of the input sampling data and the sampling correction data, and amplify the subtracted result to output two second differential output signals.

4. The decision feedback equalizer as claimed in claim 3, wherein the amplifying and comparing circuit comprises:
 a third differential amplification circuit, connected with the first sampling clock signal and configured to amplify the two first differential output signals or the two second differential output signals to obtain two third differential output signals; and
 a comparing circuit, connected with the first sampling clock signal and configured to receive the two third differential output signals, and compare the two third differential output signals to obtain a first decision signal and a second decision signal.

5. The decision feedback equalizer as claimed in claim 4, the third differential amplification circuit comprises two sets of differential inputs,
 wherein a first set of the differential inputs is respectively connected with two differential outputs of the first differential amplification circuit and configured to amplify the two first differential output signals when the second differential amplification circuit is tuned off, and
 wherein a second set of the differential inputs is turned on to output the two third differential output signals, the second set of the differential inputs is connected with two differential outputs of the second differential amplification circuit, and configured to amplify the two second differential output signals when the first differential amplification circuit is tuned off and the first set of the differential inputs is turned on to obtain the two third differential output signals.

6. The decision feedback equalizer as claimed in claim 5, wherein the selective sampling circuit further comprises:
 a first functional circuit configured to receive the sampling result in the previous sampling period; and
 a second functional circuit configured to receive the sampling result in the previous sampling period,
 wherein an output of the first functional circuit is connected with the first set of the differential inputs of the third differential amplification circuit, and the first functional circuit is configured to judge whether the first set of the differential inputs is turned on according to the sampling result acquired in the previous sampling period, and
 wherein an output of the second functional circuit is connected with the second set of the differential inputs of the third differential amplification circuit, and the second functional circuit is configured to judge whether the second set of the differential inputs is turned on according to the sampling result acquired in the previous sampling period.

7. The decision feedback equalizer as claimed in claim 4, wherein the comparing circuit comprises:
 a first inverter configured to receive the first sampling clock signal; and
 a second inverter configured to receive the first sampling clock signal, and
 wherein an input of the first inverter is connected with an output of the second inverter, an input of the second inverter is connected with an output of the first inverter, the input of the first inverter and the input of the second inverter are configured to respectively receive the two third differential output signals, and the output of the first inverter and the output of the second inverter are configured to respectively output the first decision signal and the second decision signal.

8. The decision feedback equalizer as claimed in claim 1, wherein the holding circuit is a latch.

* * * * *